United States Patent
Hong et al.

(10) Patent No.: US 8,790,817 B2
(45) Date of Patent: *Jul. 29, 2014

(54) POUCH-TYPE LITHIUM SECONDARY BATTERY

(75) Inventors: Ki-sung Hong, Yongin-si (KR); In-kyu Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 878 days.

This patent is subject to a terminal disclaimer.

(21) Appl. No.: 12/492,393

(22) Filed: Jun. 26, 2009

(65) Prior Publication Data

US 2010/0003594 A1 Jan. 7, 2010

(30) Foreign Application Priority Data

Jul. 1, 2008 (KR) .................. 10-2008-0063510

(51) Int. Cl.
*H01M 2/02* (2006.01)

(52) U.S. Cl.
USPC ........... 429/162; 429/163; 429/175; 429/176; 429/177; 429/208

(58) Field of Classification Search
CPC ... H01M 2/02; H01M 2/0202; H01M 2/0207; H01M 2/021; H01M 2/0212; H01M 2/04; H01M 2/06
USPC ........... 429/56, 127, 162, 163, 175, 176, 177, 429/208
See application file for complete search history.

(56) References Cited

U.S. PATENT DOCUMENTS

| | | | | |
|---|---|---|---|---|
| 2,797,253 A * | 6/1957 | Courtecuisse | ............... | 429/162 |
| 6,048,638 A * | 4/2000 | Pendalwar | ............... | 429/127 |
| 6,630,262 B2 * | 10/2003 | Yang et al. | ............... | 429/406 |
| 6,696,196 B1 * | 2/2004 | Eilers | ............... | 429/56 |
| 7,201,998 B2 * | 4/2007 | Kim | ............... | 429/180 |
| 7,285,334 B1 * | 10/2007 | Yamashita et al. | ............... | 428/458 |
| 7,682,735 B2 * | 3/2010 | Lee | ............... | 429/176 |
| 8,053,104 B2 * | 11/2011 | Kim | ............... | 429/163 |
| 8,218,341 B2 * | 7/2012 | Wiegman et al. | ............... | 363/37 |
| 8,228,033 B2 * | 7/2012 | Hong et al. | ............... | 320/128 |
| 2004/0115527 A1* | 6/2004 | Hiratsuka et al. | ............... | 429/176 |
| 2005/0084749 A1* | 4/2005 | Hwang et al. | ............... | 429/127 |
| 2006/0216585 A1* | 9/2006 | Lee | ............... | 429/162 |
| 2006/0216591 A1* | 9/2006 | Lee | ............... | 429/175 |
| 2007/0141452 A1* | 6/2007 | Kim | ............... | 429/120 |
| 2007/0154794 A1* | 7/2007 | Kim et al. | ............... | 429/162 |
| 2007/0202398 A1* | 8/2007 | Kim | ............... | 429/176 |

FOREIGN PATENT DOCUMENTS

| | | |
|---|---|---|
| JP | 2002-245994 | 8/2002 |
| KR | 10-2005-0036466 | 4/2005 |
| KR | 10-2007-0071247 | 4/2007 |
| KR | 10-2007-0099067 | 10/2007 |

* cited by examiner

*Primary Examiner* — Joseph Drodge
(74) *Attorney, Agent, or Firm* — Knobbe Martens Olson & Bear LLP

(57) ABSTRACT

A pouch-type lithium secondary battery including: an electrode assembly; and a case to house the electrode assembly, including first and second case portions. The first case portion includes a receiving part to receive the electrode assembly, and a wing part extending from the receiving part. The second case portion includes an outer part that is sealed to the wing part, and an extension part that extends from the outer part and is folded toward the wing part.

14 Claims, 5 Drawing Sheets

POUCH-TYPE LITHIUM SECONDARY BATTERY

CROSS-REFERENCE TO RELATED APPLICATIONS

This application claims the benefit of Korean Application No. 10-2008-0063510, filed on Jul. 1, 2008, in the Korean Intellectual Property Office, the disclosure of which is incorporated herein, by reference.

BACKGROUND OF THE INVENTION

1. Field of the Invention

Aspects of the present invention relate to a lithium secondary battery, and more particularly, to a pouch-type lithium secondary battery that can prevent a metal layer of a case from being exposed.

2. Description of the Related Art

A pouch-type lithium secondary battery includes a flexible pouch-type case. The case includes upper and lower case portions, that are formed by folding a roughly rectangular film. A groove for receiving an electrode assembly is formed inside the lower case portion, through a pressing process, etc. After the electrode assembly is received in the groove, the upper and lower case portions are sealed, by a pressing and/or heating. To realize lightweight and small-sized electronic devices, the case is formed of a composite film that includes a metal layer and inner and outer resin layers provided on opposing sides of the metal layer. Accordingly, the case has excellent formability, and thus, its shape can be freely changed.

However, the metal layer is exposed at free ends (cut edges) of the case, when the case is sealed as described above. When the secondary battery is directly mounted in a hard case, or a battery box of an electronic device, with the exposed metal layer, a short may occur between the metal layer and a conductor of a protection circuit board, a conductor of the hard case or battery box, or an electrode of the battery.

In addition, the metal layer may be corroded by an electrochemical reaction, in the above cases. The corrosion of the metal layer may lead to swelling of the battery, which can reduce the performance and durability of the battery. In addition, when the end of the case is insulated, to prevent the above phenomenon, an additional insulation process is required, and thus, may increase production costs.

SUMMARY OF THE INVENTION

An aspect of the present invention is to provide a pouch-type lithium secondary battery that can prevent the exposure of a metal layer of a case, by including bonding surfaces of upper and lower portions of the case, which have different widths, and then folding the bonding surfaces.

Another aspect of the present invention is to provide a pouch-type lithium secondary battery that can prevent a short between a metal layer of a case and an electrode of the battery.

Still another aspect of the present invention is to provide a pouch-type lithium secondary battery that can prevent swelling, due to the corrosion of a metal layer.

A further aspect of the present invention is to provide a pouch-type lithium secondary battery that is protected from performance loss and has high durability.

According to an aspect of the present invention, there is provided a pouch-type lithium secondary battery that comprises: an electrode assembly; and a case including first and second case portions, to house the electrode assembly. The first case portion includes a receiving part to receive the electrode assembly, and a wing part that extends from the receiving part. The second case portion includes an outer part that is sealed to the wing part, and an extension part that extends from the outer part and is folded against the wing part.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1A:
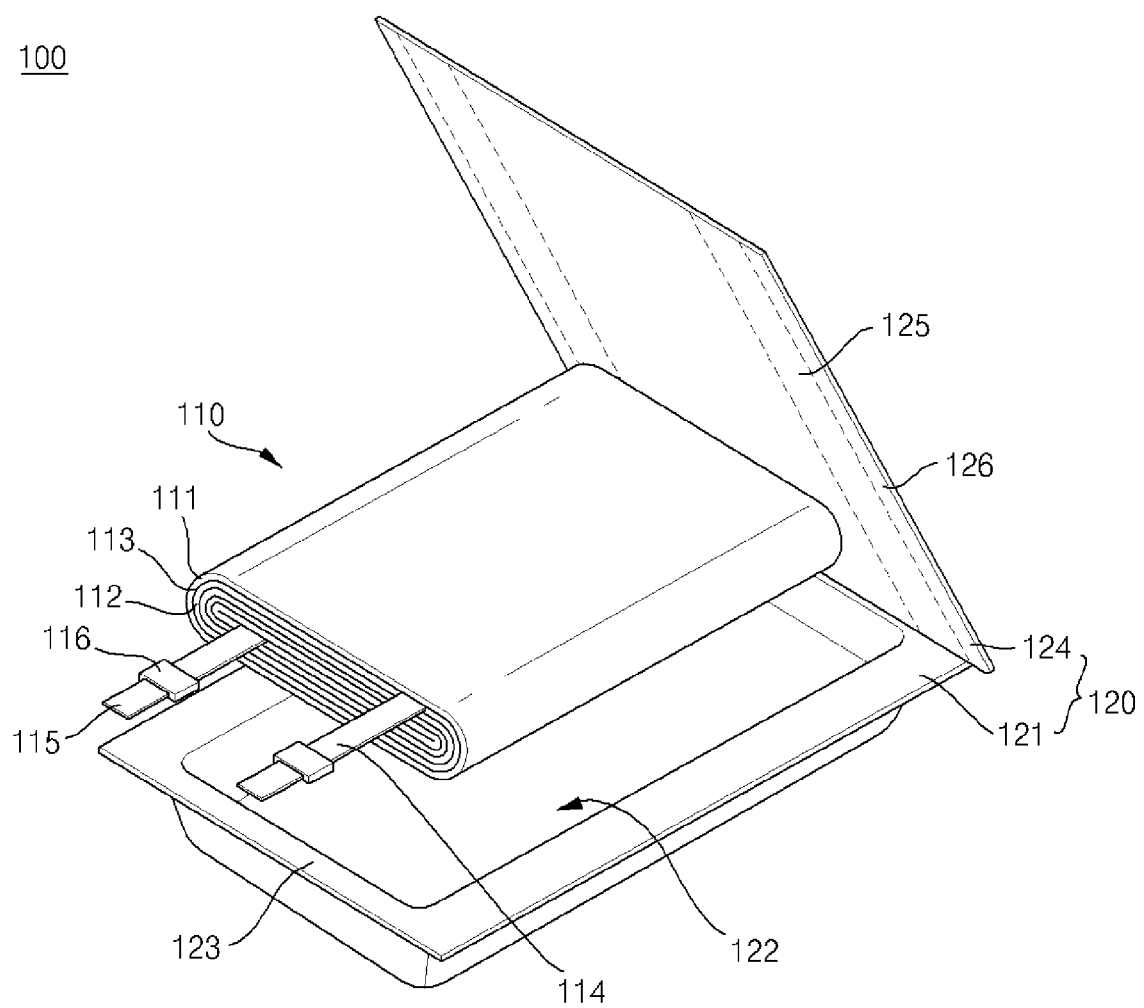
FIG. 1A is an exploded perspective view illustrating a pouch-type lithium secondary battery, according to a first exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 1B:
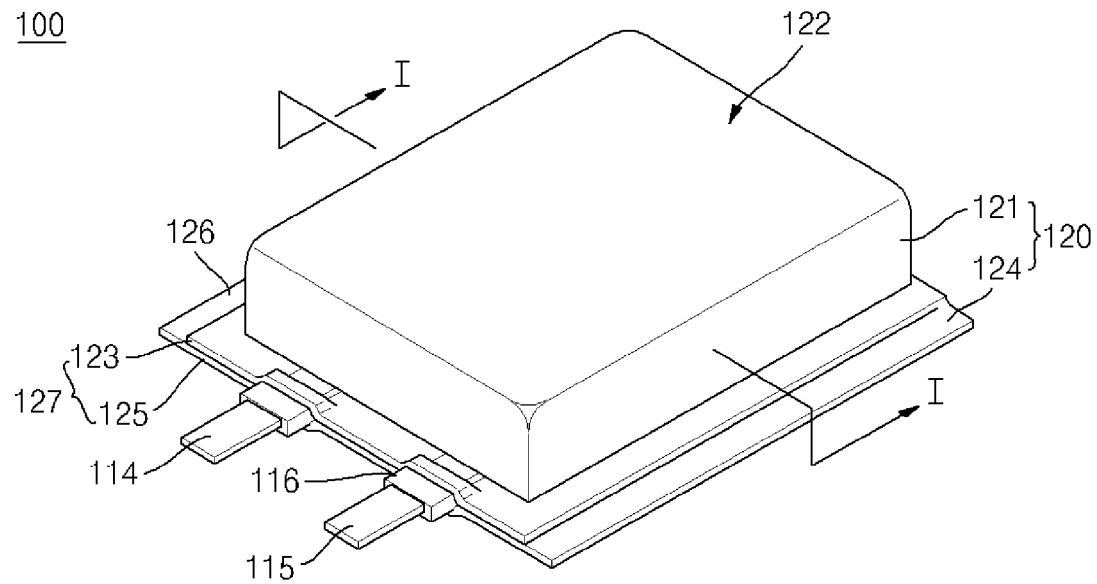
FIG. 1B is a perspective view illustrating a partially assembled state of the pouch-type lithium secondary battery of FIG. 1A.
Figure 1C:
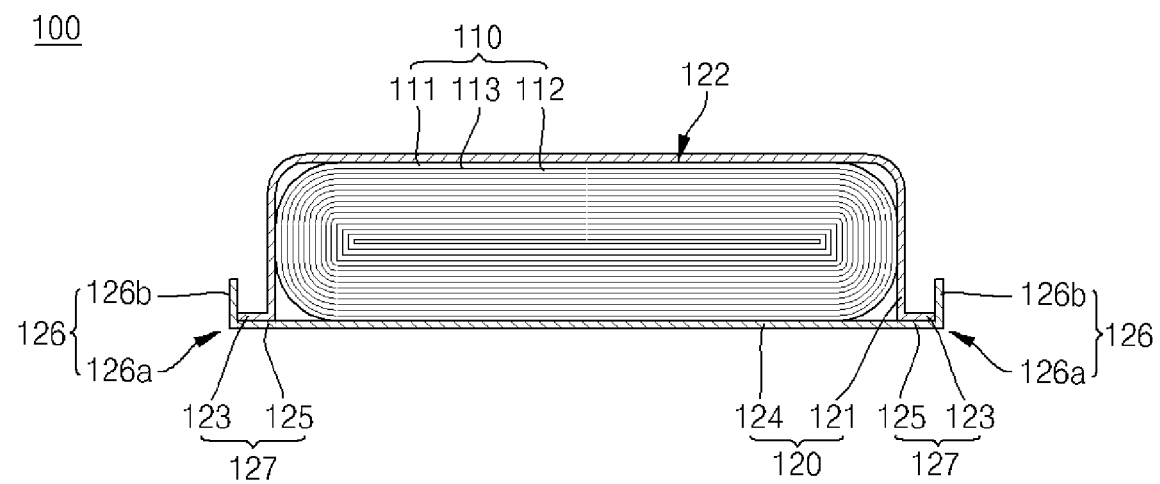
FIGS. 1C to 1E are sectional views taken along line 'I-I' of FIG. 1B, sequentially illustrating the folding of the case of the pouch-type lithium secondary battery.
Figure 1D:
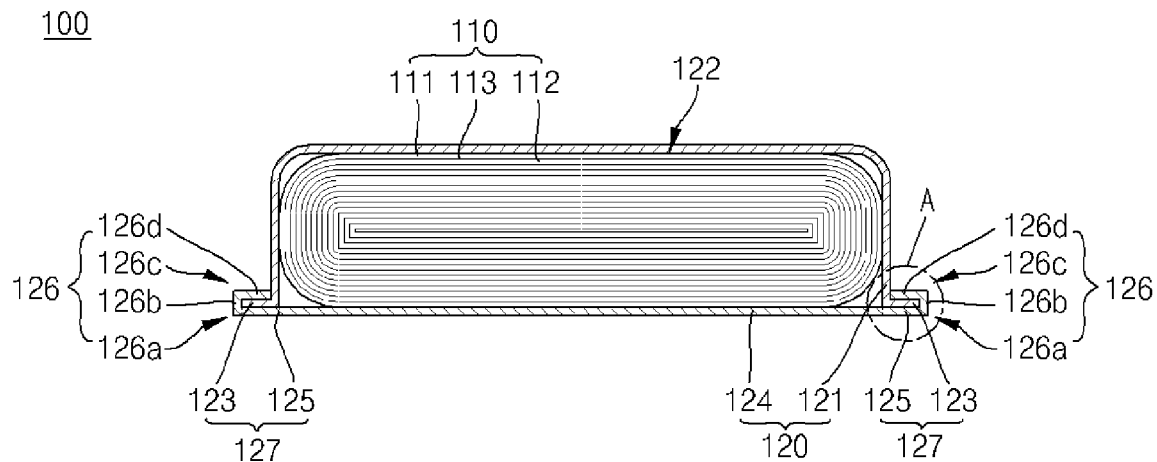
Figure 1E:
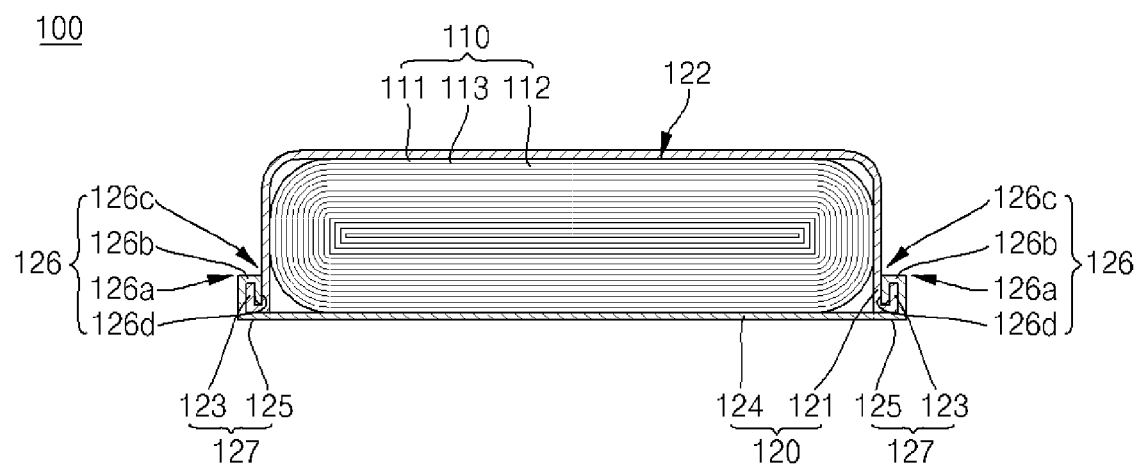
Figure 1F:
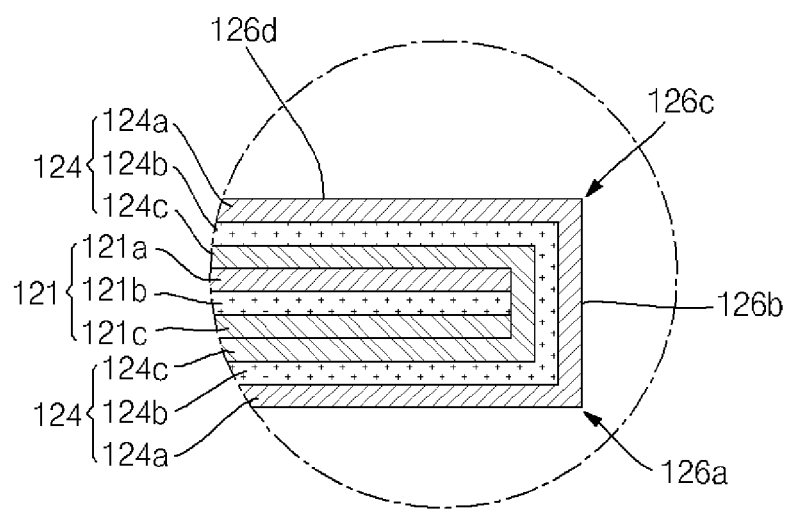
FIG. 1F is a partially magnified view illustrating portion 'A' of FIG. 1D.

FIG. 1A is an exploded perspective view illustrating a pouch-type lithium secondary battery 100, according to a first exemplary embodiment of the present invention, and FIG. 1B is a perspective view illustrating a partially assembled state of the pouch-type lithium secondary battery 100. FIGS. 1C to 1E are sectional views taken along line 'I-I' of FIG. 1B, and FIG. 1F is a magnified view illustrating portion 'A' of FIG. 1D.

Referring to FIGS. 1A to 1F, the pouch-type lithium secondary battery 100 includes an electrode assembly 110 and a case 120 to house the electrode assembly 110. The electrode assembly 110 includes a cathode plate 111, an anode plate 112, and a separator 113 interposed there between. The electrode assembly 110 further includes cathode and anode tabs 114 and 115 that project from the electrode assembly 110. The cathode and anode tabs 114 and 115 may be made of aluminum (Al), nickel (Ni), or copper (Cu). Usually, the cathode tab 114 is made of aluminum (Al), and the anode tab 115 is made of nickel (Ni). An insulation tape 116, which is made of an insulative material having excellent heat resistance and durability, is wound on the cathode and anode tabs 114 and 115, to prevent a short between the cathode and anode tabs 114 and 115, and the case 120.

The cathode and anode tabs 114 and 115 extend out of one side of the case 120 and are electrically coupled to a protection circuit module (PCM) (not shown). The PCM can include a printed circuit board (PCB) and other electrical devices. The electrode assembly 110 is usually formed by interposing the separator 113 between the cathode and anode plates 111 and 112, and then winding the same into a jellyroll-type shape. Cathode and anode active materials are respectively coated on the cathode and anode plates 111 and 112. The cathode active material may include a highly stable lithium manganese compound, and the anode active material may include a carbonic compound, but the present invention is not limited thereto.

The case 120 includes first and second case portions 121 and 124. The first and second case portions 121 and 124 are formed by folding a roughly rectangular film approximately in half. The case 120 includes insulation layers 121a and 124a, metal layers 121b and 124b, and adhesive layers 121c and 124c. The insulation layers 121a and 124a form an outer surface of the case 120, when the first and second case portions 121 and 124 are sealed together. The insulation layers 121a and 124a may be made of a resin, such as nylon, or polyethylene telephthalate. The insulation layers 121a and 124a protect and insulate the metal layers 121b and 124b, and the adhesive layers 121c and 124c. In addition, the insulation layers 121a and 124a allow a molding process to be smoothly performed. The metal layers 121b and 124b may be made of aluminum or an aluminum alloy. Aluminum has excellent expandability, flexibility, and formability and is not easily broken, even when bent.

The adhesive layers 121c and 124c form an inner surface of the case 120 and contact the electrode assembly 110, when the first and second case portions 121 and 124 are sealed. The adhesive layers 121c and 124c may be formed of cast polypropylene or polyethylene. The adhesive layers 121c and 124c may also be formed of a composite of organic and inorganic materials, which is formed by adding inorganic particles to the organic cast polypropylene/polyethylene layer.

The first case portion 121 includes a receiving part 122 and a wing part 123. The receiving part 122 is a groove or depression formed by pressing the first case portion 121. The receiving part 122 provides space to receive the electrode assembly 110 and an electrolyte (not shown). When the receiving part 122 is formed, the wing part 123 is formed at an outer edge of the first case portion 121. The wing part 123 contacts an outer part 125 of the second case portion 124, when the pouch-type lithium secondary battery 100 is assembled. The adhesive layers 121c and 124c of the wing part 123 and outer part 125 are bonded to each other, through pressing and/or heating, thereby forming a sealing part 127, which is a combination of the two layers.

The second case portion 124 includes the outer part 125 and an extension part 126. The outer part 125 corresponds to the wing part 123 of the first case portion 121. Accordingly, the wing part 123 and outer part 125 have the similar areas. The outer part 125 and the wing part 123 are sealed together, to form the sealing part 127. The extension part 126 is a region that extends horizontally from the outer part 125. In other words, the extension part 126 extends past the sealing part 127, and is not sealed. The extension part 126 is folded, in order to prevent the metal layers 121b and 124b from being exposed to the outside.

Referring to FIG. 1C, the extension part 126 includes and a first part 126b that is bent from the outer part 125, at a first crease 126a. The extension part 126 is bent at a 90 degree angle from the extension part 126, such that the first part 126 extends across a free end (cut end) of the wing part 123, which is cut perpendicular to a horizontal plane. The first part 126b generally contacts the free end of the wing part 123, so as to cover the metal layer 121b of the first case 121. As shown in FIG. 1C, the metal layer 121b of the first case portion 121 is covered, and the metal layer 124b of the second case portion 124 is exposed.

Referring to FIG. 1D, the extension part 126 is bent again at the end of the first part 126b, to form a second crease 126c and a second part 126d. The second part 126d extends from the second crease 126c, toward the receiving part 122 of the first case portion 121. The second part 126d extends at a 90 degree angle, with respect to the first part 126b. The second part 126d generally contacts the wing part 123, so as to improve the strength of a bond therebetween. The edge of the second part 126d contacts the outer surface of the receiving part 122. As a result, both of the metal layers 121b and 124b, of the first and second case portions 121 and 124, are completely insulated from the outside.

Referring to FIG. 1E, the extension part 126 and the sealing part 127 are folded toward the outer surface of the receiving part 122. The second part 126d contacts the outer surface of the receiving part 122. An end of the second part 126d contacts the wing part 123. The resultant structure insulates the metal layers 121b and 124b better than the structure shown in FIG. 1D.

The extension part 126 is completed by folding the originally flat extension part 126 as shown in FIGS. 1C to 1E. In other words, the completed extension part 126 includes the first crease 126a, the first part 126b, the second crease 126c, and the second part 126d. Thus, the first and second case portions 121 and 124 are sealed together, as shown in FIG. 1F, which illustrates portion 'A' portion of FIG. 1D.

As described above, the pouch-type lithium secondary battery 100 includes the extension part 126 that is folded around the sealing part 127. Accordingly, the pouch-type lithium secondary battery 100 can prevent the metal layers 121b and 124b of the case 120 from being exposed to the outside, and can thus, prevent a short between the metal layers 121b and 124b of the case 120 and the electrodes of the battery 100. In addition, a swelling phenomenon caused by the short can be prevented. Finally, it is possible to prevent the degradation of the performance and durability of the pouch-type lithium secondary battery 100.

Figure 2:
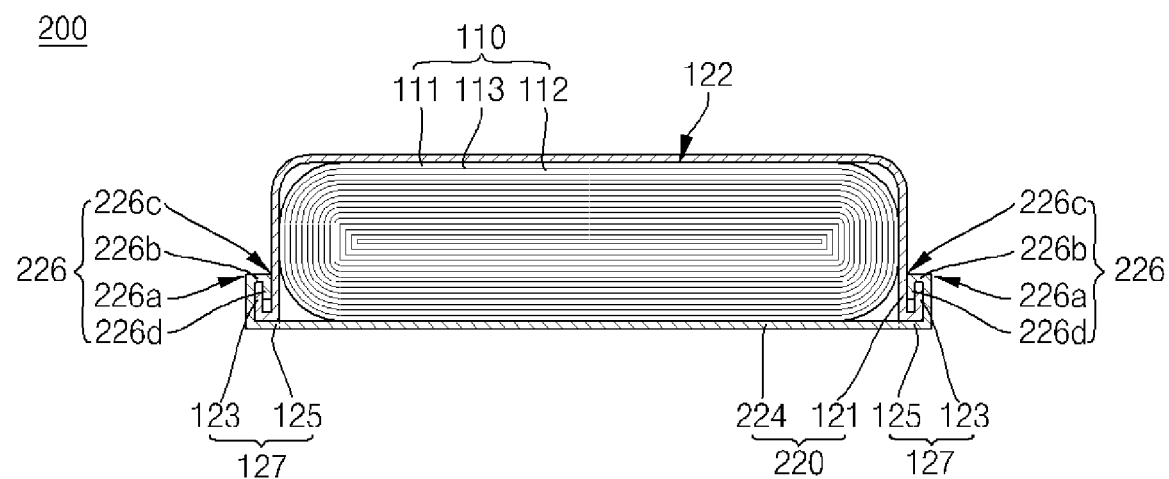
FIG. 2 is a sectional view illustrating a pouch-type lithium secondary battery, according to a second exemplary embodiment of the present invention.

FIG. 2 shows a sectional view illustrating a pouch-type lithium secondary battery 200, according to a second exemplary embodiment of the present invention. The pouch-type lithium secondary battery 200 has similar to the pouch-type lithium secondary battery 100, so only the differences therebetween will be mainly explained.

Referring to FIG. 2, the pouch-type lithium secondary battery 200 includes an electrode assembly 110 and a case 220 to house the electrode assembly 110. The case 220 is formed of the same material as the case 120. The case 220 has first and second case portions 121 and 224, that are formed by folding a roughly rectangular film in approximately in half. The second case portion 224 includes an outer part 125 and an extension part 226. The outer part 125 corresponds to a wing part 123 of the first case portion 121. The outer part 125 contacts the wing part 123, so as to form a sealing part 127. The extension part 226 is a region that extends from the outer part 125. In other words, the second case portion 224 the extension part 226 extends past the sealing part 127.

The extension part 226 includes a first crease 226a, a first part 226b, a second crease 226c, and a second part 226d, which are formed by folding the extension part 226. The first crease 226a is formed by bending the extension part 226 at a 90 degree angle, so as to cover an end of the wing part 123 with the first part 226b. The first part 226b extends from the first crease 226a to the second crease 226c. The second part 226d extends from the second crease 226c, at an angle of 90 degrees with respect to the first part 226b. The edge of the second part 226d may be spaced apart from the wing part 123. When the end of the second part 226d does not contact the wing part 123, a metal layer of the second case portion 224 is exposed to the outside.

However, the metal layer is surrounded by the receiving part 122 and the extension part 226. In addition, when the pouch-type lithium secondary battery 200 is assembled, the sealing part 127 and extension part 226 are folded toward the receiving part 122, after an initial folding. Thus, there is almost no possibility of short between the metal layer and an external conductor. On the other hand, according to the second embodiment, the folding process of the extension part 226 is simplified, as compared than the first embodiment.

Figure 3:
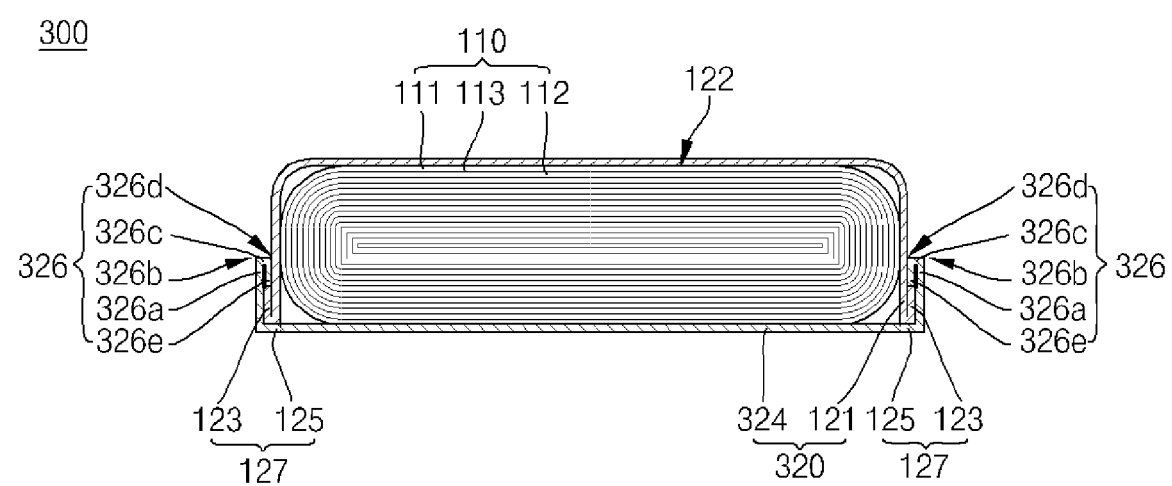
FIG. 3 is a sectional view illustrating a pouch-type lithium secondary battery, according to a third exemplary embodiment of the present invention.

FIG. 3 shows a sectional view illustrating the pouch-type lithium secondary battery 300, according to a third exemplary embodiment of the present invention. The pouch-type lithium secondary battery 300 is similar to the first exemplary embodiment, except for a final structure of an extension part 326, which will be mainly described.

The pouch-type lithium secondary battery 300 includes an electrode assembly 110 and a case 320 to house the electrode assembly 110. The case 320 includes first and second case portions 122 and 324. The second case portion 324 includes the extension part 326. The case 320 is formed of the same material as the case 120.

Referring to FIG. 3, the extension part 326 is generally U-shaped and includes a first part 326a, a first crease 326b, a second part 326c, a second crease 326d, and a third part 326e. The first part 326a extends from a sealing part 127. The first crease 326b is formed at an end of the first part 326a, and the second part 326c extends from the first crease 326b. The second part 326c covers an edge of a wing part 123 of the first case portion 122. The third part 326d extends from the second crease 326d, which is disposed at an end of the second part 326c.

The edge of the third part 326e may contact the edge of the wing part 123, which is bent toward the second part 326c. In addition, when the pouch type lithium secondary battery 300 is assembled, the sealing part 127 and extension part 326 are folded toward the receiving part 122, such that the third part 326e contacts the receiving part 122. Thus, there is almost no possibility of short between a metal layer of the case 320 and an external conductor. Accordingly, the metal layer is not exposed to the outside.

As described above, according to the third embodiment, it is possible to prevent the metal layer of the case 320 from being exposed to the outside. Thus, a short caused by contact between the metal layer and electrode, or an external conductor, can be prevented. On the other hand, the folding process of the extension part 326 is simplified, as compared than the first exemplary embodiment.

As described above, a pouch-type lithium secondary battery, according to aspects of the present invention has the following features. The bonding surfaces of upper and lower case portions of the case have different widths and are folded, thereby preventing the metal layer of the case from being exposed to the outside. A short between the metal layer of the case and the electrode of the battery can be prevented. The swelling phenomenon caused by the corrosion of the metal layer can be prevented. The resulting degradation of performance and durability can be prevented.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A pouch-type lithium secondary battery, comprising:
an electrode assembly; and
a case comprising,
a first case portion having a receiving part that defines side walls to receive the electrode assembly and a wing part having a free end and a first and a second side that extends from the receiving part, and
a second case portion folded onto the first case portion so as to close the receiving part of the first case portion so as to retain the electrode assembly therein, the second case portion having an outer part that is sealed to the wing part, and an extension part that extends from the outer part and is folded toward the free end of the wing part and is then folded towards the side walls of the first case portion so as to cover the free end and contact the first and second sides of the win art wherein the extension part comprises a first part that extends away from the receiving part, a second part that is bent from the first part and extends around the free end of the wing part, and a third part that is bent from the second part and extends toward the receiving part, and wherein the third part contacts the receiving part and wing part.

2. The pouch-type lithium secondary battery of claim 1, wherein the first and third parts are parallel.

3. A pouch-type lithium secondary battery, comprising:
an electrode assembly; and
a case comprising,
a first case portion having a receiving part that defines side walls to receive the electrode assembly and a wing part having a free end and a first and a second side that extends from the receiving part, and
a second case portion folded onto the first case portion so as to close the receiving part of the first case portion so as to retain the electrode assembly therein, the second case portion having an outer part that is sealed to the wing part, and an extension part that extends from the outer part and is folded toward the free end of the wing part and is then folded towards the side walls of the first case portion so as to cover the free end and contact the first and second sides of the wing part, wherein the outer part and the wing part are folded toward the receiving part, after the extension part is folded toward the free end of the wing part.

4. The pouch-type lithium secondary battery of claim 3, wherein the extension part contacts the receiving part.

5. The pouch-type lithium secondary battery of claim 4, wherein a free end of the extension part contacts the wing part.

6. The pouch-type lithium secondary battery of claim 4, wherein a free end of the extension part is spaced apart from the free end of the wing part.

7. A pouch-type lithium secondary battery, comprising:
an electrode assembly; and
a case comprising,
a first case portion having a receiving part that defines side walls to receive the electrode assembly and a wing part having a free end and a first and a second side that extends from the receiving part, and
a second case portion folded onto the first case portion so as to close the receiving part of the first case portion so as to retain the electrode assembly therein, the second case portion having an outer part that is sealed to the wing part, and an extension part that extends from the outer part and is folded toward the free end of the wing part and is then folded towards the side walls of the first case portion so as to cover the free end and contact the first and second sides of the wing part, wherein the extension part is bent into a U-shape and has a free end that faces the free end of the wing part.

8. The pouch-type lithium secondary battery of claim 7, wherein the wing part and the outer part are bent against the receiving part, after the extension part is bent.

9. The pouch-type lithium secondary battery of claim 8, wherein one side of the extension part contacts the receiving part.

10. The pouch-type lithium secondary battery of claim 8, wherein a free end of the extension part contacts the free end of the wing part.

11. The pouch-type lithium secondary battery of claim 7, wherein the extension part is bent twice, so as to form two 90 degree angles.

12. A pouch-type lithium secondary battery, comprising:
an electrode assembly; and
a case comprising,
a first case portion having a receiving part that defines side walls to receive the electrode assembly and a wing part having a first and a second side and a wing part that extends from the receiving part, and
a second case portion folded onto the first case portion so as to close the receiving part of the first case portion so as to retain the electrode assembly therein, the second case portion, having an outer part that is sealed to the wing part, and an extension part that extends from the outer part and is bent around the free end of the wing part and is then bent towards the side walls of the first case portion so as to cover the free end and contact the first and second sides of the wing part, wherein the extension part is U-shaped, and a free end of the extension part contacts the receiving part.

13. The pouch-type lithium secondary battery of claim 12, wherein:
the extension part is U-shaped, and a free end of the extension part contacts the wing part; and
the wing part is bent toward the receiving part.

14. A pouch-type lithium secondary battery, comprising:
an electrode assembly; and
a case comprising,
a first case portion having a receiving part that defines side walls to receive the electrode assembly and a wing part having a first and a second side and a wing part that extends from the receiving part, and
a second case portion folded onto the first case portion so as to close the receiving part of the first case portion so as to retain the electrode assembly therein, the second case portion, having an outer part that is sealed to the wing part, and an extension part that extends from the outer part and is bent around the free end of the wing part and is then bent towards the side walls of the first case portion so as to cover the free end and contact the first and second sides of the wing part, wherein the extension part is U-shaped, and a free end of the extension part faces and is spaced apart from a portion of the wing part; and the wing part is bent toward the receiving part.

* * * * *